Patented Sept. 20, 1927.

1,642,667

UNITED STATES PATENT OFFICE.

GODSKALK BERGE, OF CHICAGO, ILLINOIS, ASSIGNOR OF ONE-THIRD TO HARRY SPURRIER, OF CHICAGO, ILLINOIS.

PROCESS FOR DECOMPOSING INSOLUBLE MINERALS.

No Drawing. Application filed December 4, 1925. Serial No. 73,274.

This invention relates to improvements in processes for decomposing insoluble minerals and for the economical recovery of the bases of such minerals and their separation one from the other in such form as to be available for use in their raw state or in the manufacture of products dependent upon chemical processes.

The object of the invention is to afford a process which can be maintained on a large scale, and in a commercial way, whereby large quantities of chemical substances can be produced at relatively low cost.

A further object of the invention is to provide a commercial process for the decomposition of potash or orthoclase feldspar into its several bases, which in turn are converted into commercially useful forms, the more important being iron free aluminum silicate, required in the textile industries, and potassium nitrate, an essential ingredient of artificial fertilizers.

Feldspar is an example of an insoluble mineral consisting largely of silicates of aluminum and potassium which, when decomposed by the process herein disclosed, will yield its bases in soluble form separable from each other. The decomposition of feldspar and the separation of the products of such decomposition is, however, but one consideration in the commercial utility and success of the process, since of equal importance is the complete recovery and repeated use of the several acid reagents which are used, because otherwise the process would be too costly to be of commercial value, and hence of interest merely as a laboratory demonstration.

With this introduction, I will proceed to disclose the process so that it can be readily understood and practiced by those skilled in the art.

Taking, therefore, orthoclase feldspar, a chemically impure substance composed chiefly of a double silicate of aluminum and potassium, a given quantity of the mineral is first crushed and ground to a suitable degree of fineness, and then mixed with a predetermined amount of boric acid or boric anhydride, sufficient to convert the potassium silicate into potassium borate. It is to be noted at this point that it is the preferred step in the process to convert only the potassium silicate and to permit the aluminum silicate to remain as such.

In this case, the amount of boric acid added would be sufficient to combine with the potassium bases. However, if it is desired to convert both the potassium and aluminum silicates into borates, an increased proportion of boric acid would be used. But, as already stated, it is preferred to convert only the potassium silicate, this being considered the preferable method of treatment, since the only amount of boric acid required is that sufficient to convert the potassium silicate, and therefore, the process can be carried out with much greater economy.

However, it is more economical and therefore preferable to use only such an amount of boric acid as to convert the potassium silicate, with the intention that the aluminum silicate shall remain unconverted.

The actual conversion takes place when the mixture of crushed feldspar and boric acid is heated to a relatively high temperature, which results in the production of water soluble potassium borate (borate of potash), acid soluble aluminum silicate, and a quantity of soluble ferro-borate, the amount of the latter depending on the amount of iron present in the feldspar.

In this connection it is to be observed that as to the amount of boric acid used, and the amount and temperature of the heat required, it must necessarily vary with the character of the feldspar being treated. It is therefore quite impossible to give specific figures in this regard, although any variations can be readily controlled by those skilled in the art.

After the heating process, the mass consisting of the products just named is ground and then treated with dilute nitric acid, which produces a solution containing the nitrates of potassium and iron, and a small amount of aluminum nitrate, boric acid and a solid residue of silicate of aluminum free from iron, and minute quantities of impurities. Of the several ingredients comprising the residue, the silicate of aluminum can be separated out iron free by decomposition in the presence of sulphuric acid which produces free silica and a solution of nearly pure iron free sulphate of alumina, this being of great importance since iron free aluminum sulphate only can be used in the textile industries and therefore its value is directly dependent on its freedom from iron.

Thus the separation of the residue by filtration, which includes all of the impurities, as well as the aluminum silicate (which is the first by-product removed and recovered), leaves an acid liquor consisting of the nitrates and boric acid. This acid solution or liquor is then concentrated by heating to such a point that the boric acid separates out in solid form and is recovered by the usual methods, for further use, thus leaving the mother liquor consisting chiefly of nitrate of potassium, a lesser amount of iron nitrate and usually a small quantity of aluminum nitrate.

The next step in the process is to evaporate the mother liquor to dryness, and then by continued heating at a predetermined degree of temperature, the nitrates of iron and aluminum are decomposed into iron oxide and aluminum oxide (alumina) liberating free nitric acid which is recovered in the usual manner.

As the final step, the dried mixture of potassium nitrate, iron and aluminum oxides, is treated with water, whereby the potassium nitrate goes into solution leaving the iron and aluminum oxides as a residue which is readily removed by filtration.

Manifestly, this leaves as the final product, potassium nitrate in solution which can be readily converted into its dry state by further evaporation, and thus reduced to its ultimate commercial and marketable form, as a fertilizer or constituent of fertilizing preparations.

To give a concrete example of the results of the process as it would be carried out on a commercial scale, it may be assumed that feldspar of good average quality is used, that is to say, one giving the following figures on analysis:

| | Per cent. |
|---|---|
| Silica | 65.40 |
| Oxide of aluminum | 17.12 |
| Oxide of iron | .18 |
| Lime | .11 |
| Oxide of magnesium | .01 |
| Potash | 12.85 |
| Soda | 4.22 |
| Total | 99.89 |

Based on an amount of 200,000 lbs. of feldspar of the above analysis, the following products and their respective amounts by weight would be produced or recovered:

| | Pounds. |
|---|---|
| Silica | 130,800 |
| Oxide of iron | 360 |
| Potassium nitrate | 55,164 |
| Aluminum sulphate, free from iron | 223,742 |
| Sodium nitrate | 8,440 |

In addition to the above amounts, there will also be small quantities of calcium and magnesium nitrates, which can be disregarded as being unprofitable to recover.

Among the chief advantages of the process is the fact that it can be carried out with a minimum of cost, since each step provides for the recovery of every ingredient which is eliminated, either as a residue or in such form that it can be readily treated and thus rendered available for use. Of particular importance is the recovery of the basic reagent, boric acid, which is a relatively costly substance and which if not made available for repeated use, would make the process impossible of practical and commercial use. But since the boric acid is recovered in its free state after the decomposition of the borates into nitrates, the cost of carrying on the process is brought well within limits which permit the marketing of the ultimate product at lower price than it can be obtained by, or from any other known method or source.

In setting forth the process embodying the invention as applied to potash feldspar, it is to be understood that other minerals may be susceptible of treatment by the same or variations of the same process, without departing from the spirit of the invention.

I claim as my invention:

1. The process of decomposing insoluble minerals consisting of treating the mineral with boric acid in the presence of heat sufficient to convert predetermined of its basic constituents into borates and treating the borates with dilute nitric acid to convert the same into nitrates and free boric acid.

2. The process of decomposing insoluble minerals consisting of heating a mixture of the mineral and boric acid in an amount and at a temperature sufficient to convert its alkali-metal bases into borates, and treating the borates with dilute nitric acid to form alkali-metal nitrates and free boric acid.

3. The process of decomposing insoluble minerals containing a silicate consisting of heating a mixture of the mineral and boric acid to convert the silicate to a borate, treating said borate with dilute nitric acid to form a nitrate and free boric acid, and recovering the free boric acid.

4. The process of decomposing insoluble minerals containing an alkali-metal silicate in combination with other metallic bases, consisting of heating a mixture of the mineral and boric acid to a temperature sufficient to convert the silicate to a borate leaving the metallic bases unconverted, treating the resulting mixture with nitric acid to convert the borate into a nitrate and free boric acid, and separately recovering the free boric acid, nitrate and metallic bases.

5. The process of decomposing insoluble minerals containing alkali-metal and non-alkali silicates in combination, consisting of mixing a quantity of the mineral with sufficent boric acid to react with the alkali-metal silicates present, heating the mixture to a temperature sufficiently high to convert the alkali-metal silicates to borates, and leaving the non-alkali-metal silicates unconverted, and removing the unconverted silicates.

6. The process of decomposing minerals containing silicate free or/and in combination, consisting of heating a mixture of the mineral and boric acid to convert the silicates into borates, treating the borates with dilute nitric acid to form nitrates and free boric acid, removing the boric acid and recovering the nitrate.

7. The process of decomposing minerals containing silicate free or in combination, consisting of mixing a quantity of the mineral with boric acid in an amount sufficient to react with the alkali-metal silicates present, heating the mixture to a temperature sufficient to convert the alkali-metal silicates into borates, removing the silicates not converted by said heat treatment, treating the converted borates with nitric acid to convert the same into nitrates and free boric acid, and recovering the free boric acid.

8. The process of decomposing minerals consisting of mixing with a quantity of the crushed mineral, an amount of boric acid sufficient to react with the silicate of potassium present, heating the mixture at a temperature sufficient to convert the potassium silicate into potassium borate, treating the resulting product with nitric acid to produce potassium nitrate and free boric acid, and separating out and recovering the free boric acid.

9. The process of decomposing minerals consisting of adding to a quantity of the crushed mineral sufficient boric acid to convert the silicate of potassium, heating the mixture to convert the potassium silicate into potassium borate and treating the resulting product with nitric acid to produce potassium nitrate, nitrates of said other minerals and free boric acid, separating out the boric acid, decomposing the said nitrates of said other minerals into oxides, and removing said oxides.

10. The process of decomposing minerals consisting of mixing with a quantity of the crushed mineral sufficient boric acid to react with the silicate of potassium, heating the mixture at a predetermined temperature sufficient to convert the potassium silicate into potassium borate, treating the resulting product with nitric acid to produce potassium nitrate, nitrates of said other minerals and free boric acid, heating the resulting liquor to remove the boric acid in solid form, decomposing the said nitrates of the other minerals into oxides by heat, dissolving the potassium nitrate in water and filtering out the said oxides.

11. The process of decomposing a mineral containing potassium and another silicate, consisting of treating a quantity of the finely divided mineral with a sufficient quantity of boric acid to convert the potassium silicate into potassium borate, leaving said other silicate unconverted, treating the resulting mixture with nitric acid to form potassium nitrate, free boric acid and a silicate residue, and separating out the nitrate, free acid and residue.

12. The process of decomposing an insoluble mineral composed of silicates, consisting of treating the mineral with boric acid, heating the mixture to form acid soluble borates and water insoluble silicates, and separating the borates from the silicates by solution in dilute nitric acid.

13. The process of decomposing a mineral containing potassium and aluminum silicates, consisting of treating the mineral with boric acid, heating the mixture to form potassium borate and aluminum silicate, separating the borate from the silicate by solution in dilute nitric acid, and the recovery of free boric acid by evaporation and filtration.

14. The process of decomposing a mineral containing potassium and aluminum silicate, consisting of mixing the mineral with boric acid, heating the mixture to convert the potassium silicate into potassium borate, treating the resulting product with dilute nitric acid to form a solution of potassium nitrate, aluminum nitrate, free boric acid, and a residue of aluminum silicate, removing the silicate residue by filtration and decomposing the aluminum nitrate by calcination.

15. The process of decomposing a mineral containing potassium and aluminum silicates, consisting of mixing the mineral with boric acid, heating the mixture to convert the potassium silicate into potassium borate, treating the resulting product with dilute nitric acid to form a solution of potassium nitrate, aluminum nitrate, free boric acid, and a residue of aluminum silicate, removing the silicate residue by filtration, heating the remaining product to decompose the aluminum nitrate into aluminum oxide and to liberate free nitric acid, adding water to dissolve the potassium nitrate, removing the oxide by filtration and recovering the free nitric acid.

16. The process of decomposing a mineral composed chiefly of potassium and aluminum silicate, consisting of mixing the mineral with boric acid, heating the mixture to convert the potassium silicate into potassium borate, treating the resulting product with dilute nitric acid to form a solution of potassium, aluminum and iron nitrates, free boric acid, and a residue of iron free aluminum silicate, removing the silicate residue by filtration, heating the remaining product to decompose the aluminum and iron nitrates into their oxides and to liberate free nitric acid, adding water to dissolve the potassium nitrate, removing the oxides by filtration and recovering the free nitric acid from the solution, and finally evaporating the potassium nitrate solution to dryness.

Signed at Chicago, Ill., this 1st day of December, 1925.

GODSKALK BERGE.